United States Patent
Wendelmuth et al.

(10) Patent No.: US 10,189,348 B2
(45) Date of Patent: Jan. 29, 2019

(54) MOTOR VEHICLE UNDERTRAY TRIM PANEL HAVING AN AIR INLET

(71) Applicant: Ford Global Technologies, LLC, Dearborn, MI (US)

(72) Inventors: Harald Wendelmuth, Lahnstein (DE); Alberto Fontana, Cologne (DE); Morten Pyroth, Cologne (DE); Thomas Nitsche, Neuss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/712,610

(22) Filed: Sep. 22, 2017

(65) Prior Publication Data
US 2018/0093561 A1 Apr. 5, 2018

(30) Foreign Application Priority Data
Sep. 30, 2016 (DE) .......................... 10 2016 219 033

(51) Int. Cl.
*B60K 11/08* (2006.01)
*B62D 35/02* (2006.01)

(52) U.S. Cl.
CPC .............. *B60K 11/08* (2013.01); *B62D 35/02* (2013.01)

(58) Field of Classification Search
CPC .......... B60K 11/06; B60K 11/08; B62D 35/02
See application file for complete search history.

(56) References Cited

U.S. PATENT DOCUMENTS 2,913,065 A * 11/1959 Lyon, Jr. ................ B60K 11/04
                                                          123/41.06
4,455,045 A *  6/1984 Wheeler ................. B62D 35/00
                                                          105/1.2

(Continued)

FOREIGN PATENT DOCUMENTS

DE            1102073 A1    7/1992
DE          19952782 A1    5/2001

(Continued)

*Primary Examiner* — Brian L Swenson
(74) *Attorney, Agent, or Firm* — Jason Rogers; Price Heneveld LLP

(57) ABSTRACT

A motor vehicle undertray trim panel having an air inlet which is delimited toward the vehicle and the roadway by upper and lower flat elements, respectively, which extend arcuately rearward and upward in the direction of a vehicle components. The upper flat element runs, starting from a front end which lies in the vehicle longitudinal direction, in front of, adjacent to or behind an internal combustion engine of the motor vehicle and below a front radiator, first of all approximately horizontally and at a spacing below an oil sump of the internal combustion engine and then in a continuously steeper curve to its rear end which lies behind the oil sump and which is adjoined by a planar air ram plate which runs such that it is directed by a small amount substantially vertically upward, and then ends substantially freely in the engine compartment. The lower flat element runs, from a front end which lies in the vehicle longitudinal direction behind the rear end of the upper flat element, in a steeper curve than the upper flat element rearward and upward to a rear end which lies even further rearward and substantially higher than the rear end of the upper flat element.

15 Claims, 1 Drawing Sheet

(56) References Cited

U.S. PATENT DOCUMENTS

| | | | |
|---|---|---|---|
| 5,025,878 A | 6/1991 | Preiss | |
| 5,513,893 A | 5/1996 | Nakata et al. | |
| 7,270,206 B2* | 9/2007 | Guertler | B60K 11/06 180/309 |
| 8,544,583 B2* | 10/2013 | Ajisaka | B60K 11/08 180/68.1 |
| 8,955,628 B2* | 2/2015 | Murray | B60K 11/08 180/68.1 |
| 9,102,368 B2* | 8/2015 | Kimura | B62D 35/02 |
| 9,227,677 B2 | 1/2016 | Hillstroem et al. | |
| 9,950,611 B2* | 4/2018 | Pfeiffer | B60K 11/08 |
| 2004/0231898 A1* | 11/2004 | Hochkoenig | B60K 11/06 180/68.1 |
| 2013/0059519 A1 | 3/2013 | Tajima et al. | |
| 2013/0106135 A1 | 5/2013 | Praskovsky et al. | |
| 2014/0251241 A1 | 9/2014 | Tajima | |
| 2015/0021111 A1* | 1/2015 | Hillstroem | B60K 13/04 180/89.2 |
| 2016/0185402 A1* | 6/2016 | Tesch | B62D 35/02 280/788 |
| 2018/0093560 A1* | 4/2018 | Nitsche | B62D 35/02 |

FOREIGN PATENT DOCUMENTS

| | | |
|---|---|---|
| DE | 102006046814 A1 | 4/2008 |
| DE | 102012001459 A1 | 7/2013 |
| DE | 102012205582 A1 | 10/2013 |
| JP | 04356225 A | 12/1992 |

\* cited by examiner

MOTOR VEHICLE UNDERTRAY TRIM PANEL HAVING AN AIR INLET

FIELD OF THE INVENTION

The present invention generally relates to a motor vehicle undertray trim panel having an air inlet which is delimited toward the vehicle engine compartment and toward the roadway to cool components of the vehicle.

BACKGROUND OF THE INVENTION

An undertray trim panel is generally disclosed in DE 10 2012 205 582 A1 which is configured as a diffuser in the rear region of a motor vehicle. Included is a lower flat element formed by way of a trim panel of the rear bumper and not ending freely, but rather curving forward in an arc. In motor vehicles having an internal combustion engine, for example in the front region, components can be situated in the engine compartment in front of, to the side of and, in particular, behind the internal combustion engine, which components are to be flowed around by cool air, in order to be cooled in an optimum manner. The air should be cooler than the air which tends to be warmer and has flowed through the front radiator and the associated fan and then as a general rule flows through the remaining engine compartment. It is possible, however, for the latter air to be cool enough for other components, in particular those which lie closer to the engine. In general, however, the air inlet can also serve for any other type of air supply for units or components, not only for cooling purposes.

In order to cool components behind the internal combustion engine with fresh air which heat up during operation and must not become too hot, what is known as a NACA air inlet can be provided to supply favorable air flow in the undertray trim panel. The air inlet typically extends below the oil sump of the engine and opens into the space which lies behind the engine. A NACA air inlet requires certain minimum dimensions, however, in particular a certain length and height in relation to the vehicle longitudinal direction, in order to operate efficiently, and its lowermost part typically must be at a legally prescribed minimum spacing from the roadway. Therefore, a NACA air inlet typically restricts the packaging space available above it in the engine compartment.

Although the NACA air inlet in the abovementioned document DE 10 2012 205 582 A1 generally has a relatively low overall height, it is sufficient here because only a component which lies directly above it is to be cooled, namely a rear muffler which is additionally arranged in a housing, through which the supplied fresh air flows. In order that flow can also pass satisfactorily onto components which lie further to the top in an engine compartment, the NACA air inlet would also have to reach as far as there, since otherwise a premature split of the cool air flow would take place, in particular as a result of the warmer air which circulates in the engine compartment and has flowed through the front radiator and the associated fan. Owing to its construction, the NACA air inlet commonly has a linearly, obliquely running ramp with a correspondingly relatively large overall height.

It would be desirable to provide a motor vehicle undertray trim panel having an air inlet in such a way that it both takes up relatively little space in the engine compartment, in particular in the vertical direction, but also supplies components which lie in front of, to the side of or behind the internal combustion engine with cooling fresh air in an optimum manner. It would be desirable that this function be ensured in a manner which is as neutral as possible with regard to harmful resistances, such as vehicle air resistance.

SUMMARY OF THE INVENTION

According to one aspect of the present invention, a motor vehicle undertray trim panel is provided. The undertray traim panel includes an air inlet which is delimited toward a vehicle engine compartment and toward a roadway by an upper and a lower flat element, respectively, which flat elements extend arcuately rearward and upward in the direction of the engine compartment, in which components to be cooled of the vehicle are situated. The upper flat element runs, starting from a front end which lies in a vehicle longitudinal direction, in front of an internal combustion engine of the motor vehicle and below a front radiator, approximately horizontally and at a spacing below an oil sump of the internal combustion engine and then in a continuously steeper curve to its rear end which lies behind the oil sump and which is adjoined by a planar air ram plate which extends by a small amount substantially vertically upward, and then ends substantially freely in the engine compartment. The lower flat element runs, from a front end which lies in the vehicle longitudinal direction behind the rear end of the upper flat element, in a steeper curve than the upper flat element rearward and upward to a rear end which lies even further rearward and substantially higher than the rear end of the upper flat element.

According to another aspect of the present invention, a motor vehicle undertray trim panel is provided. The motor vehicle undertray trim panel includes an air inlet having upper and lower flat elements directed toward an engine compartment and a roadway and extending arcuately rearward and upward toward the engine compartment, wherein the lower flat element extends in a steeper curve than the upper flat element rearward and upward to a rear end which lies rearward and higher than a rear end of the upper flat element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
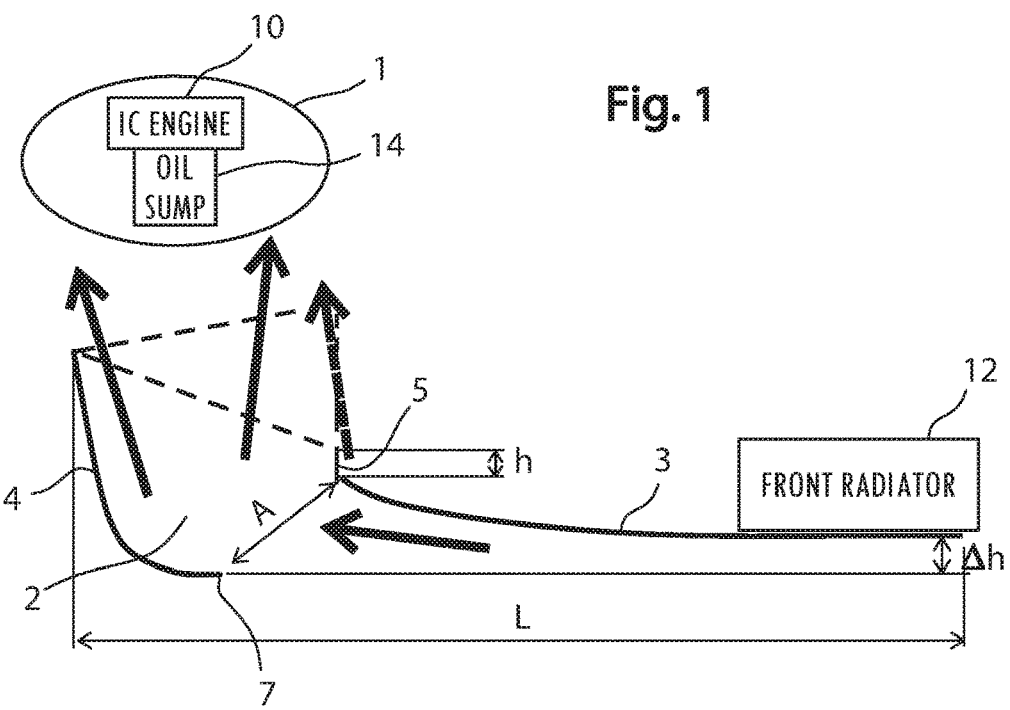
FIG. 1 is a diagrammatic longitudinal sectional view of an undertray trim panel having a FESAD air inlet for cooling components in the engine compartment of a motor vehicle.

FIG. 1 diagrammatically shows, by way of example in a longitudinal section through a motor vehicle, a section of an engine compartment which is situated at the front in the vehicle and in which there is an elliptically encircled region 1, in which one or more components of the vehicle or its drive are situated, which become warm during operation and require special cooling. As viewed in the vehicle longitudinal direction, the region 1 lies behind an internal combustion engine 10 which serves as the vehicle drive, according to one embodiment, and is cooled by the undertray trim panel.

A FESAD air inlet 2 serves to cool the components in the region 1 of the engine compartment. Included is a duct which is configured in an undertray trim panel of the vehicle and is delimited toward the engine compartment and toward the motor by an upper flat element 3 which begins below a front radiator 12 and toward the roadway forward of the vehicle by a lower flat element 4 and laterally by side walls. The flat elements 3 and 4 extend in each case arcuately rearward and upward in the direction of the region 1. The flat elements 3 and 4 are delimited or directed towards the engine compartment and roadway to receive air at the front end and direct the air flow to the engine compartment for cooling.

During driving, relatively cool fresh air flows from the undertray trim panel into the region 1, as indicated by continuous solid arrows. Moreover, there is a relatively warm air flow (indicated using a dashed arrow) above the upper flat element 3 from a fan of a front radiator below an oil sump 14 of the internal combustion engine 10, the internal combustion engine 10 being situated in the figure to the left of the dashed arrow and above the upper flat element 3.

Typically, in the case of a conventional design of the air inlet, both the upper flat element and the lower flat element would run or extend in continuously steeper arcs. In the case of a design of this conventional type, however, part of the warmer air which flows above the upper flat element would be directed into the region 1 to be cooled and would impede the fresh air flow through the air inlet 2.

Figure 3:
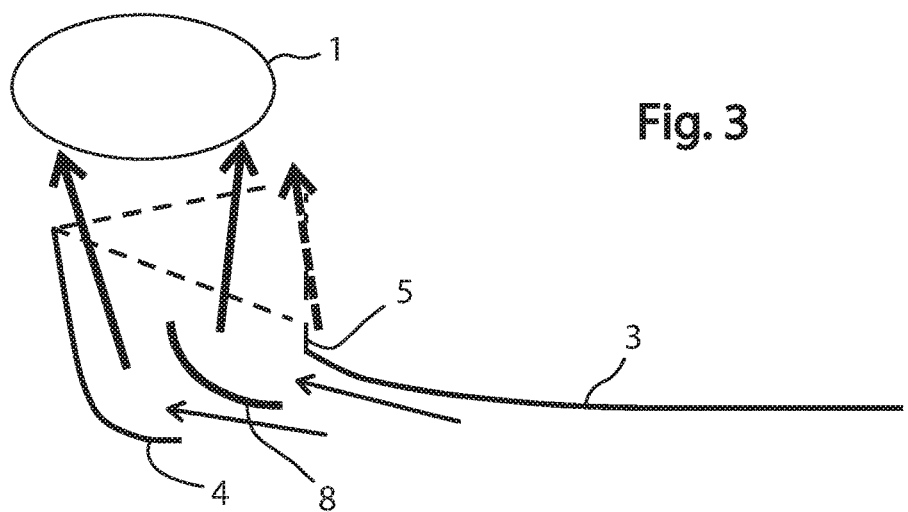
FIG. 3 is a diagrammatic partial sectional side view of a development of the undertray trim panel having the FESAD air inlet from FIGS. 1 and 2.

In the case of the design of the undertray trim panel which is shown in FIG. 1 of the present disclosure, the rear end of the upper flat element 3 is adjoined by a planar air ram plate 5 which runs or extends by a small amount shown as height distance h in a substantially vertically upwardly directed manner and then ends substantially freely in the engine compartment. The height distance h is limited substantially merely by components which are situated in the installation space. As a result, the air inlet 2 has an air outlet area which is directed to the component(s) to be cooled and is indicated in FIGS. 1 and 3 using dashed lines. The distance h is to be designed at a maximum as a result of the conditions arising in the installation space, and the angle, by which the air outlet area of the FESAD air inlet is inclined with respect to the vehicle longitudinal direction, results from the installation space conditions and is about 20 degrees in this example, with a variation of ±10 degrees.

The short vertically bent-away air ram plate 5 has the effect that it tends to deflect the warmer air flow upward or to the side, with the result that the cooler and warmer air flows remain largely separated even behind the air ram plate 5, and the region 1 is loaded exclusively by the cooler air, as desired.

The described and shown design of the undertray trim panel advantageously makes it possible to make the vertical extent of the FESAD air inlet 2 smaller than in the case of a conventionally designed NACA air inlet, with the result that space is saved in the engine compartment, in particular in the region above the upper flat element 3.

Figure 2:
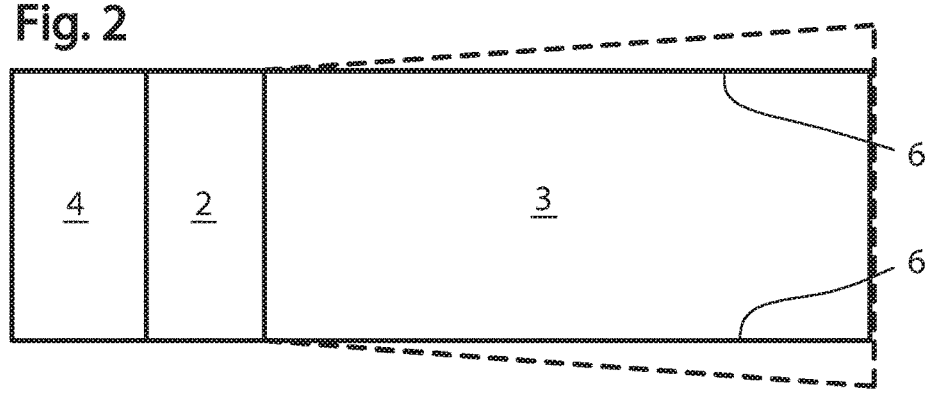
FIG. 2 is a bottom view of the undertray trim panel having the FESAD air inlet in FIG. 1.

As can be seen from FIG. 2, the air inlet 2 is delimited laterally by way of side walls 6 which extend more or less vertically between the upper and the lower flat elements 3, 4 and connect the latter to one another.

As is indicated in FIG. 3 using dashed lines, the air inlet 2 and, in particular, the upper flat element 3 together with the side walls can widen toward the vehicle front, in order to capture more air and to accelerate it over its length. Thus, the front end of the air inlet 2 is wider than the rear end in this embodiment. More rapidly flowing air allows the sensitivity for air flow separation as a result of changing pressure conditions in the engine compartment to be reduced on the upper flat element 3, or the upper flat element 3 to be curved to a greater extent.

As can be seen from FIG. 1, an opening cross section, effective in the vertical, of the air inlet 2 is determined, by the front width of the air inlet 2, by a dimension $\Delta h$, by which a front and lower end 7 of the lower flat element 4 or a rubber lip which is optionally attached to it lies lower than the front and lower end of the upper flat element 3. The dimension $\Delta h$ can be, for example, in a range from a few millimeters to 10 centimeters, the minimum dimension being dependent on the desired air throughput.

A diagonal opening cross section of the air inlet 2 is determined by the spacing A between the front and lower end 7 of the lower flat element 4 and the connecting point between the upper flat element 3 and the air ram plate 5. The air inlet 2 has an overall length L.

As shown in the partial sectional view of FIG. 3, one or more arcuate air guiding plates 8 can additionally be arranged in the air inlet 2, the curvature of which air guiding plates 8 is adapted to the curvatures of the upper and lower flat elements 3, 4, with the result that they run parallel to the intended air stream and first of all split the air flow through the air inlet 2 into parallel part flows and combine them again. An air guiding plate 8 of this type initiates the formation of a new stable boundary layer in the air flow.

The motor vehicle undertray trim panel provides an improved NACA air inlet, what is known as a "flat efficient submerged air intake device" (FESAD) air inlet which runs less obliquely than a NACA duct and has a lower overall height. In accordance with one embodiment, the upper flat element extends from a front end which lies in the vehicle longitudinal direction, in particular in front of an internal combustion engine of the motor vehicle and below a front radiator, approximately horizontally and at a spacing of, for example, a few centimeters below an oil sump of the internal combustion engine and then in a continuously steeper arc to its rear end which lies behind the oil sump. This is adjoined by a planar air ram plate which runs by a small amount substantially vertically upward and then ends substantially freely in the engine compartment. The air ram plate which bends away vertically from the upper flat element deflects the air which tends to be warmer and is allowed to pass through the fan of the front radiator between the oil sump and the upper flat element away from the cooler air flow through the FESAD air inlet, with the result that the cooler air flow is not disrupted as a result. In addition, the lower flat element runs, from a front end which lies in the vehicle longitudinal direction behind the rear end of the upper flat element, in a substantially steeper arc than the upper flat element rearward and upward to a rear end which lies even further rearward and substantially higher, for example by from approximately 10 to 25 centimeters, than the rear end of the upper flat element.

It has been shown that the flow separation effect of a relatively short planar air ram plate which bends away from the upper flat element and then ends freely in the engine compartment is practically at least just as satisfactory as if the upper flat element were led further in an arc. It would have to be substantially longer and therefore would take up more space in the engine compartment, in order that flow also passes reliably onto the abovementioned components which are to be cooled satisfactorily.

Therefore, the undertray trim panel according to one embodiment can be of relatively flat design overall or at least partially, particularly below the components in the installation space, such as an internal combustion engine in the engine compartment, for which reason the engine and the entire drive train can be arranged lower in the vehicle with a constant ground clearance, as is desired for many motor vehicles.

In one embodiment, the front end of the lower flat element lies below the lowest point of the upper flat element by a given height difference of preferably a few centimeters, which lowest point is usually situated at the front end of the upper flat element.

The planar air ram plate preferably runs for a few centimeters substantially vertically upward as far as its free end, a few centimeters being understood here to mean a range from approximately 2 to 10 centimeters.

In one embodiment, at least the upper flat element is wider from the front toward the rear in relation to the vehicle transverse direction.

The air inlet can comprise at least one additional air guiding plate which runs parallel to the intended air stream and divides the air flow into parallel part flows on part of its path through the air inlet.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle undertray trim panel comprising an air inlet which is delimited toward a vehicle engine compartment and toward a roadway by an upper and a lower flat element, respectively, which flat elements extend arcuately rearward and upward in the direction of the engine compartment, in which components to be cooled of the vehicle are situated, wherein the upper flat element runs, starting from a front end which lies in a vehicle longitudinal direction, in front of an internal combustion engine of the motor vehicle and below a front radiator, approximately horizontally and at a spacing below an oil sump of the internal combustion engine and then in a continuously steeper curve to its rear end which lies behind the oil sump and which is adjoined by a planar air ram plate which extends by a small amount substantially vertically upward, and then ends substantially freely in the engine compartment, and wherein the lower flat element runs, from a front end which lies in the vehicle longitudinal direction behind the rear end of the upper flat element, in a steeper curve than the upper flat element rearward and upward to a rear end which lies even further rearward and substantially higher than the rear end of the upper flat element.

2. The undertray trim panel as claimed in claim 1, wherein a front end of the lower flat element lies below the lowest point of the upper flat element or below its front end by a given height difference.

3. The undertray trim panel as claimed in claim 2, wherein the height difference is up to a few centimeters.

4. The undertray trim panel as claimed in claim 1, wherein the planar air ram plate runs in a substantially vertically upwardly directed manner a few centimeters as far as the free end.

5. The undertray trim panel as claimed in claim 1, wherein at least the upper flat element becomes wider from the front toward the rear.

6. The undertray trim panel as claimed in claim 1, wherein the air inlet comprises at least one additional air guiding plate which runs parallel to the intended air stream and divides the air flow into parallel part flows on part of its path through the air inlet.

7. A motor vehicle undertray trim panel comprising:
an air inlet having upper and lower flat elements directed toward an engine compartment and a roadway and extending arcuately rearward and upward toward the engine compartment, wherein the lower flat element extends in a steeper curve than the upper flat element rearward and upward to a rear end which lies rearward and higher than a rear end of the upper flat element, and wherein the rear end of the upper flat element is adjoined by a planar air ram plate extending substantially vertically upward.

8. The undertray trim panel of claim 7, wherein the upper flat element extends in a vehicle longitudinal direction in the engine compartment, and wherein the lower flat element extends, from a front end which lies in the vehicle longitudinal direction behind the rear end of the upper flat element.

9. The undertray trim panel as claimed in claim 8, wherein the upper flat element runs, starting from a front end which lies in the vehicle longitudinal direction, in front of an internal combustion engine of the motor vehicle and below a front radiator, approximately horizontally and at a spacing below an oil sump of the internal combustion engine and then in a continuously steeper curve to its rear end which lies behind the oil sump and which is adjoined by the planar air ram plate which runs is directed by a small amount substantially vertically upward, and then ends substantially freely in the engine compartment.

10. The undertray trim panel as claimed in claim 9, wherein the planar air ram plate runs in a substantially vertically upwardly directed manner a few centimeters as far as its free end.

11. The undertray trim panel as claimed in claim 7, wherein a front end of the lower flat element lies below the lowest point of the upper flat element or below its front end by a given height difference.

12. The undertray trim panel as claimed in claim 11, wherein the height difference is up to a few centimeters.

13. The undertray trim panel as claimed in claim 7, wherein at least the upper flat element becomes wider from the front toward the rear.

14. The undertray trim panel as claimed in claim 7, wherein the air inlet comprises at least one additional air guiding plate which runs parallel to the intended air stream and divides the air flow into parallel part flows on part of its path through the air inlet.

15. A vehicle undertray trim panel comprising:
an air inlet comprising upper and lower flat elements extending arcuately rearward and upward toward an engine compartment, wherein the lower flat element extends in a steeper curve than the upper flat element rearward and upward to a rear end higher than a rear end of the upper flat element; and
a planar air ram plate extending substantially vertically upward from the rear end of the upper flat element.

* * * * *